Feb. 18, 1958
G. E. FLURSCHUTZ
2,823,964
GUIDE BEARING
Filed April 12, 1955
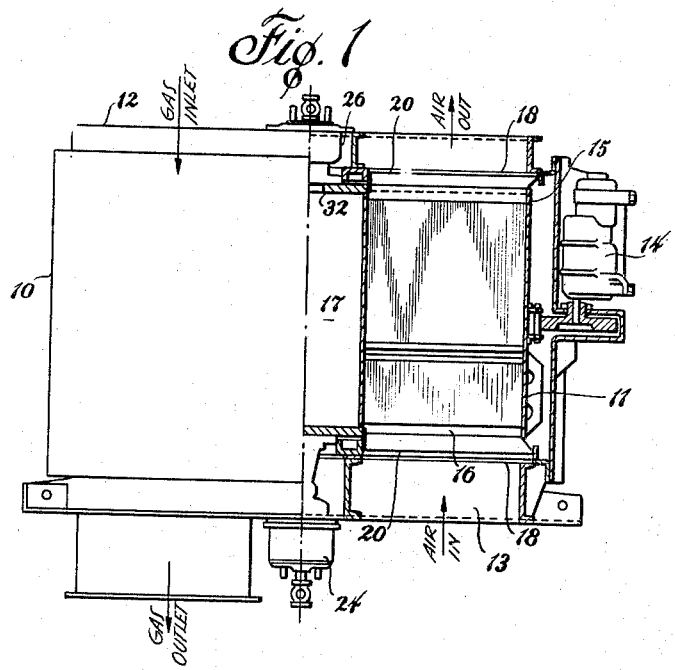
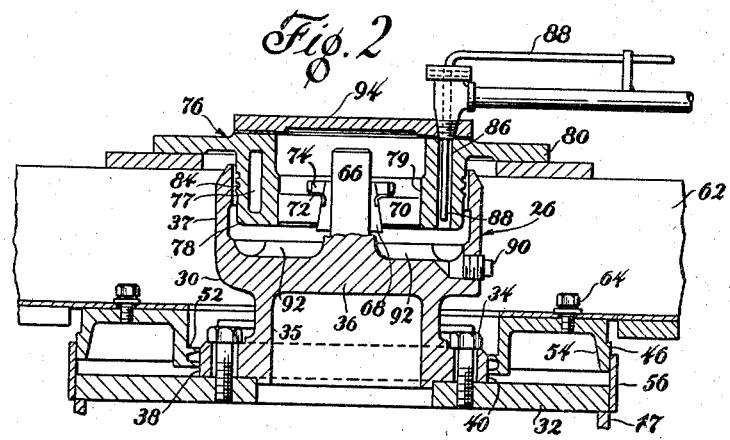
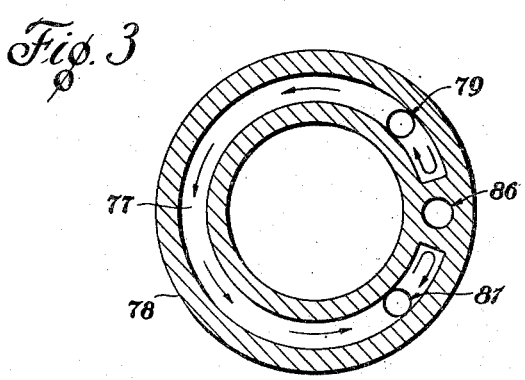
INVENTOR
Glenn E. Flurschutz
By Wayne Lang.
AGENT United States Patent Office 2,823,964
Patented Feb. 18, 1958

2,823,964

GUIDE BEARING

Glenn E. Flurschutz, Wellsville, N. Y., assignor to The Air Preheater Corporation, New York, N. Y., a corporation of New York Application April 12, 1955, Serial No. 500,749

2 Claims. (Cl. 308—77)

The present invention relates to a guide bearing for a rotating shaft, and particularly to a guide bearing for the rotor post of a rotary regenerative air preheater.

In heat exchangers of the rotary regenerative type, heating gases and relatively cool air or other fluids to be heated pass in counterflow relation on opposite sides of a plane through the vertical axis of a rotor which is carried by a concentrically located rotor post. The rotor post is supported at one end by a support bearing, while the other end is maintained in alignment by means of a guide bearing which permits free and unencumbered rotation of the rotor shaft while restraining it against lateral misalignment.

The principal object of this invention is therefore to provide freely rotatable guide bearing for the rotor shaft of a rotary air preheater or the like. It is a further object of this invention to provide a guide bearing of the type defined which is simple and economical to manufacture while also offering inherent advantages of strength and efficiency of operation.

Figure 1 is a side elevation, partly in section, showing a rotary air preheater having a rotor guide bearing as herein disclosed.

Figure 2 is a sectional elevation of a rotor guide bearing showing the cooperative relationship between the shaft bearing and the bearing housing.

Figure 3 is a sectional plan view through the support housing.

As illustrated in the drawing, the air preheater comprises a housing 10 surrounding a rotor 11 which contains heat transfer material brought first into contact with the gases entering at 12 for absorbing heat therefrom, and then into contact with air entering the preheater at 13 for imparting heat thereto. The rotor is turned by a motor and reduction gear assembly as is indicated at 14. The rotor comprises a cylindrical shell 15, connected by radial partition 16, to a rotor post 17. Sector plates 18 at the end of housing 10, opposite ends of the rotor 11, are formed with aligned openings as at 20 for passing heating gases and air through the rotor. Rotor post 17 is pivotally mounted for turning about its axis on a lower support bearing 24, and an upper guide bearing 26.

In accordance with the present invention the upper guide bearing includes a trunnion member 30, which is axially aligned with and connected to an end portion 32 of rotor post 17 by bolts 34. The trunnion 30 comprises a pair of cup-like portions 35 and 37 oppositely extending from a partition 36. The lower cup-like portion 35 has a flange 38 at its lower extremity to provide means whereby trunnion casting 30 may be attached to the rotor post. The peripheral edge 40 of the trunnion flange 38 provides a sealing surface which cooperates with flanges 52 of sealing ring 46 to preclude passage of dust and dirt from the gas stream to the atmosphere. The post sealing ring includes a second annular surface member 54 extending axially into sealing contact with an extension 56 of rotor post 17. The post sealing ring 46 is supported by an independent structural support 62 to which it is fixed by bolts 64.

Extending upward from the partition 36 is the cup-like portion 37 which lies in axial alignment with portion 35. Concentrically aligned within cup-like portion 37 is the bearing shaft 66 which is adapted to receive a tapered sleeve 68, over which a standard anti-friction bearing 70 is fitted. A lock washer 72, and nut 74, screwed to the sleeve retain the bearing member in position. Support housing 76 having an annular cored projection 78 extends into the annular space between cup-shaped portion 37 and the peripheral surface of bearing 70. The surface 79 of the support housing is finish machined to embrace bearing 70 outwardly whereby said bearing may be firmly held between the inner surface 79 of the support housing and the bearing shaft 66.

The lateral flange 80 of the support housing 76 is firmly attached to the support structure 62 illustrated in Figure 2 as the structure to which the post sealing ring is attached. The peripheral outer surface 84 of support housing 76 is loosely fitted within the inner surface of cup-shaped housing member 37 to permit limited lateral movement between members 76 and 37.

The annular portion of the support housing 76 is cored to provide a passageway 77 for a cooling fluid having an inlet 79 and an outlet 81 arcuately spaced to provide access for an inlet duct 86 through which lubricating oil may be introduced to the cup-like housing 37. The oil is introduced in sufficient quantities to submerge the bearing assembly 70, as will be indicated by the bayonet type oil level gauge 88 introduced through inlet duct 86. An oil drain plug 90 positioned in the bottom of housing 37 permits draining the contents thereof. Fins 92 integrally formed in the bottom of portion 37 provide means for agitating the lubricating oil so that it may be thoroughly subjected to a cooling fluid circulating through the passageway 77. A bearing housing cover plate 94 encloses the apparatus to bar entry of foreign particles.

In operation lubricating fluid is admitted into the housing portion 37 until the bearing is submerged to the proper level as indicated by gauge 88. A source of cold water is attached to entrance duct 79, and a drain outlet is attached to duct 81. As the rotor assembly including rotor post 17 and trunnion member 30 rotate about their axis, the lubricating medium in housing 36 is agitated by fins 92 thereby forcing the lubricant into contact with the bearing member and the cored projection 78 of the support housing 76.

From the foregoing description it will be apparent that applicant has provided a simple yet efficient guide bearing for a rotor shaft in combination with integrally arranged lubricating and cooling systems.

What is claimed is:

1. A guide bearing assembly for restraining lateral movement of a rotor post or the like comprising; a bearing shaft supported axially from an end of a rotor post; a cylindrical housing member concentric with the bearing shaft and supported from the end of the rotor post to provide an annular space surrounding said bearing shaft; an anti-friction bearing positioned in said annular space inwardly embracing the bearing shaft and outwardly embraced by a cylindrical support housing, the remote end of said cylindrical support housing being laterally flanged to provide means supporting said housing independently of the bearing; duct means extending through the support housing to provide access for introducing a lubricant into the annular space occupied by said anti-friction bearing; an annular passageway extending substantially around said support housing to provide space for the passage of cooling fluid; and fin means formed in the base of the housing enclosing said annular space to agitate the lubricating medium and cause it to be thoroughly subjected to the cooling effects of the cooling fluid.

2. A guide bearing for a rotor post as defined in claim 1 wherein the annular passageway through the support housing traverses that portion of the support housing which outwardly embraces the anti-friction bearing, whereby the cooling fluid is permitted to circulate immediately adjacent the heat producing bearing.

References Cited in the file of this patent

UNITED STATES PATENTS

| | | |
|---|---|---|
| 1,133,811 | Mackintosh | Mar. 30, 1915 |
| 1,821,772 | Ruthman | Sept. 1, 1931 |
| 1,987,937 | Howarth | Jan. 15, 1935 |
| 2,013,387 | Johnston | Sept. 3, 1935 |
| 2,684,273 | Fears et al. | July 20, 1954 |